United States Patent
Cutler et al.

(10) Patent No.: US 7,852,369 B2
(45) Date of Patent: Dec. 14, 2010

(54) INTEGRATED DESIGN FOR OMNI-DIRECTIONAL CAMERA AND MICROPHONE ARRAY

(75) Inventors: Ross Cutler, Duvall, WA (US); Ivan Tashev, Kirkland, WA (US); Yong Rui, Sammamish, WA (US); Anoop Gupta, Woodinville, WA (US)

(73) Assignee: Microsoft Corp., Redmond, WA (US)

( * ) Notice: Subject to any disclaimer, the term of this patent is extended or adjusted under 35 U.S.C. 154(b) by 817 days.

(21) Appl. No.: 10/184,499

(22) Filed: Jun. 27, 2002

(65) Prior Publication Data

US 2004/0001137 A1 Jan. 1, 2004

(51) Int. Cl.
*H04N 7/14* (2006.01)
(52) U.S. Cl. ............... 348/14.08; 348/14.09; 348/14.12
(58) Field of Classification Search ... 348/14.01–14.16; 379/454, 453, 447; *H04N 7/14*
See application file for complete search history.

(56) References Cited

U.S. PATENT DOCUMENTS

| | | | |
|---|---|---|---|
| 4,658,425 A | 4/1987 | Julstrom | 381/81 |
| 5,539,483 A | 7/1996 | Nalwa | |
| 5,625,410 A * | 4/1997 | Washino et al. | 348/154 |
| 5,745,305 A * | 4/1998 | Nalwa | 359/725 |
| 5,793,527 A | 8/1998 | Nalwa | |
| 5,990,934 A | 11/1999 | Nalwa | |
| 6,005,611 A | 12/1999 | Gullichsen et al. | |
| 6,043,837 A | 3/2000 | Driscoll, Jr. et al. | |
| 6,072,522 A * | 6/2000 | Ippolito et al. | 348/14.08 |
| 6,111,702 A | 8/2000 | Nalwa | |
| 6,115,176 A | 9/2000 | Nalwa | |

(Continued)

FOREIGN PATENT DOCUMENTS

JP        404210194 A  *  7/1992

(Continued)

OTHER PUBLICATIONS

Nanda, H. and R. Cutler. Practical calibrations for a real-time digital omnidirectional camera. CVPR 2001 Technical Sketch, Kawai.

(Continued)

*Primary Examiner*—Melur Ramakrishnaiah
(74) *Attorney, Agent, or Firm*—Lyon & Harr, LLP; Katrina A. Lyon

(57) ABSTRACT

An omni-directional camera (a 360 degree camera) is proposed with an integrated microphone array. The primary application for such a camera is videoconferencing and meeting recording, and the device is designed to be placed on a meeting room table. The microphone array is in a planar configuration, and the microphones are located as close to the desktop as possible to eliminate sound reflections from the table. The camera is connected to the microphone array base with a thin cylindrical rod, which is acoustically invisible to the microphone array for the frequency range [50-4000] Hz. This provides a direct path from the person talking to all of the microphones in the array, and can therefore be used for sound source localization (determining the location of the talker) and beam-forming (improving the sound quality of the talker by filtering only sound from a particular direction). The camera array is elevated from the table to provide a near frontal viewpoint of the meeting participants.

51 Claims, 6 Drawing Sheets

U.S. PATENT DOCUMENTS

| | | | |
|---|---|---|---|
| 6,128,143 A | 10/2000 | Nalwa | |
| 6,141,145 A | 10/2000 | Nalwa | |
| 6,144,501 A | 11/2000 | Nalwa | |
| 6,175,454 B1 | 1/2001 | Hoogland et al. | |
| 6,195,204 B1 | 2/2001 | Nalwa | |
| 6,219,089 B1 | 4/2001 | Driscoll, Jr. et al. | |
| 6,219,090 B1 | 4/2001 | Nalwa | |
| 6,222,683 B1 | 4/2001 | Hoogland et al. | |
| 6,244,759 B1* | 6/2001 | Russo | 396/428 |
| 6,278,478 B1* | 8/2001 | Ferriere | 348/14.01 |
| 6,285,365 B1 | 9/2001 | Nalwa | |
| 6,313,865 B1 | 11/2001 | Driscoll, Jr. et al. | |
| 6,331,869 B1 | 12/2001 | Furlan et al. | |
| 6,337,708 B1 | 1/2002 | Furlan et al. | |
| 6,341,044 B1 | 1/2002 | Driscoll, Jr. et al. | |
| 6,346,967 B1 | 2/2002 | Gullichsen et al. | |
| 6,356,296 B1 | 3/2002 | Driscoll, Jr. et al. | |
| 6,356,397 B1 | 3/2002 | Nalwa | |
| 6,369,818 B1 | 4/2002 | Hoffman et al. | |
| 6,373,642 B1 | 4/2002 | Wallerstein et al. | |
| 6,375,370 B1* | 4/2002 | Wesselink | 348/143 |
| 6,388,820 B1 | 5/2002 | Wallerstein et al. | |
| 6,392,687 B1 | 5/2002 | Driscoll, Jr. et al. | |
| 6,424,377 B1 | 7/2002 | Driscoll, Jr. et al. | |
| 6,426,774 B1 | 7/2002 | Driscoll, Jr. et al. | |
| 6,439,515 B1* | 8/2002 | Powers | 248/129 |
| 6,459,451 B2 | 10/2002 | Driscoll, Jr. et al. | |
| 6,466,254 B1 | 10/2002 | Furlan et al. | |
| 6,480,229 B1 | 11/2002 | Driscoll, Jr. et al. | |
| 6,493,032 B1 | 12/2002 | Wallerstein et al. | |
| 6,515,696 B1 | 2/2003 | Driscoll, Jr. et al. | |
| 6,539,547 B2 | 3/2003 | Driscoll, Jr. et al. | |
| 6,583,815 B1 | 6/2003 | Driscoll, Jr. et al. | |
| 6,593,969 B1 | 7/2003 | Driscoll, Jr. et al. | |
| 6,597,520 B2 | 7/2003 | Wallerstein et al. | |
| 6,628,897 B2* | 9/2003 | Suzuki | 396/20 |
| 6,700,711 B2 | 3/2004 | Nalwa | |
| 6,714,249 B2* | 3/2004 | May et al. | 348/373 |
| 6,741,250 B1 | 5/2004 | Furlan et al. | |
| 6,756,990 B2 | 6/2004 | Koller | |
| 6,885,509 B2 | 4/2005 | Wallerstein et al. | |
| 6,924,832 B1 | 8/2005 | Shiffer et al. | |
| 2002/0012066 A1* | 1/2002 | Nagai | 348/373 |
| 2002/0034020 A1 | 3/2002 | Wallerstein et al. | |
| 2002/0063802 A1 | 5/2002 | Gullichsen et al. | |
| 2002/0094132 A1 | 7/2002 | Hoffman et al. | |
| 2002/0141595 A1 | 10/2002 | Jouppi | 381/2 |
| 2002/0154417 A1 | 10/2002 | Wallerstein et al. | |
| 2002/0191071 A1* | 12/2002 | Rui et al. | 348/14.03 |
| 2003/0142402 A1 | 7/2003 | Carbo, Jr. et al. | |
| 2003/0193606 A1 | 10/2003 | Driscoll, Jr. et al. | |
| 2003/0193607 A1 | 10/2003 | Driscoll, Jr. et al. | |
| 2004/0008407 A1 | 1/2004 | Wallerstein et al. | |
| 2004/0008423 A1 | 1/2004 | Driscoll, Jr. et al. | |
| 2004/0021764 A1 | 2/2004 | Driscoll, Jr. et al. | |
| 2004/0252384 A1 | 12/2004 | Wallerstein et al. | |
| 2004/0254982 A1 | 12/2004 | Hoffman et al. | |

FOREIGN PATENT DOCUMENTS

| | | | |
|---|---|---|---|
| JP | 06-295333 | * | 10/1994 |
| JP | 08-032945 | * | 2/1996 |
| JP | 408032945 A | * | 2/1996 |
| JP | 08-340466 | * | 12/1996 |
| JP | 10-149447 | * | 6/1998 |
| JP | 304329 | * | 11/1998 |
| JP | 11-041577 | * | 2/1999 |
| JP | 411041577 A | * | 2/1999 |
| JP | 2000-106556 | * | 4/2000 |
| JP | 02000106566 A | * | 4/2000 |
| JP | 2000-181498 | * | 6/2000 |
| JP | 02000181498 A | * | 6/2000 |
| JP | 2000-308040 | * | 11/2000 |
| JP | 02000308040 A | * | 11/2000 |

OTHER PUBLICATIONS

Szeliski, R. and H.-Y. Shum. Creating full view panoramic image mosaics and texture-mapped models. In *SIGGRAPH '97*, pp. 251-258, 1997.

Zhang, Z., L. Zhu, S.Z. Li. and HJ Zhang. Real-Time Multi-vies Face Detection. Face and Gesture Recognition, 2002, Washington DC.

PCT/US95/10681, Date Mar. 6, 1997, Ramsay, Filing Date Aug. 23, 1995.

* cited by examiner

INTEGRATED DESIGN FOR OMNI-DIRECTIONAL CAMERA AND MICROPHONE ARRAY

BACKGROUND

1. Technical Field

This invention is directed toward an integrated omni-directional camera and microphone array. More specifically, this invention is directed towards an integrated omni-directional camera and microphone array that can be used for teleconferencing and meeting recording.

2. Background Art

Video conferencing systems have had limited commercial success. This is due to many factors. In particular, there are typically numerous technical deficiencies in these systems. Poor camera viewpoints and insufficient image resolution make it difficult for meeting participants to see the person speaking. This is compounded by inaccurate speaker detection (especially for systems with pan-tilt-zoom cameras) that causes the camera not to be directed at the person speaking. Additionally, poor video compression techniques often result in poor video image quality and "choppy" image display.

The capturing devices of systems used for teleconferencing tend to focus on a few major sources of data that are valuable for videoconferencing and meeting viewing. These include video data, audio data, and electronic documents or presentations shown on a computer monitor. Given that numerous software solutions exist to share documents and presentations, the capture of audio and video data in improved ways is of special interest.

Three different methods exist to capture video data: pan/tilt/zoom (PTZ) cameras, mirror-based omni-directional cameras, and camera arrays. While PTZ cameras are currently the most popular choice, they have two major limitations. First, they can only capture a limited field of view. If they zoom in too closely, the context of the meeting room is lost; if they zoom out too far, people's expressions become invisible. Second, because the controlling motor takes time to move the camera, the camera's response to the meeting (e.g., switching between speakers) is slow. In fact, PTZ cameras cannot move too much or too fast, otherwise people watching the meeting can be quite distracted.

Given these drawbacks and recent technological advances in mirror/prism-based omni-directional vision sensors, researchers have started to rethink the way video is captured and analyzed. For example, BeHere Corporation provides 360° Internet video technology in entertainment, news and sports webcasts. With its interface, remote users can control personalized 360° camera angles independent of other viewers to gain a "be here" experience. While this approach overcomes the two difficulties of limited field of view and slow camera response faced by the PTZ cameras, these types of devices tend to be too expensive to build given today's technology and market demand. In addition, these mirror prism-based omni-directional cameras suffer from low resolution (even with 1 MP sensors) and defocusing problems, which result in inferior video quality.

In another approach, multiple inexpensive cameras or video sensors are assembled to form an omni-directional camera array. For example, one known system employs four National Television System Committee (NTSC) cameras to construct a panoramic view of a meeting room. However, there are disadvantages with this design. First, NTSC cameras provide a relatively low quality video signal. In addition, the four cameras require four video capture boards to digitize the signal before it can be analyzed, transmitted or recorded. The requirement for four video capturing boards increases the cost and complexity of such a system, and makes it more difficult to manufacture and maintain.

Besides the problems noted with video capture, capturing high-quality audio in a meeting room is also challenging. The audio capturing system needs to remove a variety of noises and reverberation. It also must adjust the gain for different levels of input signal. In general, there are three approaches to address these requirements. The simplest approach is to use close-up microphones (e.g., via headset), but this is cumbersome and intrusive to the user/speaker. A second approach is to place a microphone on the meeting room table. This prevents multiple acoustic paths and is currently the most common approach to recording meeting audio. These systems use several (usually three) hypercardioid microphones to provide omni-directional characteristics. The third approach is provided in a desktop teleconferencing system. In this approach, a unidirectional microphone is mounted on top of a PTZ camera, which points at the speaker. The camera/microphone group is controlled by a computer that uses a separate group of microphones to perform sound source localization. This approach, however, requires two separate sets of microphones.

SUMMARY

The present invention is directed towards a system and process that overcomes the aforementioned limitations in videoconferencing and meeting recording systems. Specifically, the present system and method employs an integrated omni-directional camera and microphone array to accomplish this task.

In the most general sense, the invention consists of a cylindrical rod that is thin enough to be acoustically invisible for the frequency ranges of human speech (50-4000 Hz) and connects a camera array to a microphone array. As a result, sound diffraction and shadowing are eliminated.

The integrated camera and microphone array employs a 360-degree camera designed to solve each of the aforementioned problems with video conferencing. The 360-degree camera can be positioned in the center of a conference table, which gives a superior camera viewpoint of the participants compared to a typical video conferencing system (in which the camera is at one end of the room). The camera is elevated from the table to provide a near frontal viewpoint of the meeting participants. Additionally, the integrated camera and microphone array provides sufficient resolution for a remote viewer to see facial expressions from meeting participants (e.g., in one working embodiment it has a resolution of 3000× 480). The camera can be of any omni-directional type, either employing a camera array or a single video sensor with a hyperbolic mirror.

The microphone array is in a planar configuration. The microphones are preferably mounted in a microphone array base, so as to be located as close to the desktop as possible to eliminate sound reflections from the table. As mentioned previously, the camera is connected to the microphone array base with a thin cylindrical rod, which is acoustically invisible to the microphone array for the frequency range of the human voice (i.e., about 50-4000 Hz). This provides a direct path from the person talking, to all of the microphones in the array, making it superior for sound source localization (determining the location of the speaker) and beam-forming (improving the sound quality of the speaker by filtering out sound not coming from the direction of the speaker). The integrated microphone array is used to perform real-time sound source localization, and the camera array is used with computer vision based human detection and tracking to accurately detect where speakers are located in the image. The audio and video based speaker detection can be used for automatic camera management, as well as greatly improved video compression (e.g., by using more bits on facial regions than the background).

The output of the integrated camera and microphone array is preferably connected to the PC, where such applications as image stitching and compression, sound source localization, beam-forming, and camera management may take place.

One working embodiment of the integrated camera and microphone array uses a 1394 bus to transfer video to the PC, and analog cables to transfer audio to a Personal Computer (PC). Five IEEE 1394 cameras that provide superior video quality and only require a single 1394 card are employed in this embodiment. Another alternate embodiment uses a single Printed Circuit Board (PCB) for all cameras and microphones, so that all audio and video is transmitted over a single 1394 cable. The 1394 cable also provides power, so only a single cable is needed between the camera and PC.

The microphones used can be either omni-directional or unidirectional, though omni-directional are preferred, as they give a uniform response for all sound angles of interest. The minimum number of microphones needed is three, though a preferred embodiment of the invention uses eight for increased sound source localization accuracy, better beam-forming and robustness of the whole audio system. The microphones are preferably equilaterally disposed in a circle around the circumference of round, planar microphone base, although other configurations are also possible. The more microphones that are used the better the omni-directional audio coverage and signal to noise ratio. However, the cost and complexity of greater numbers of microphones is a tradeoff. Additionally, with more microphones, processing of the audio signals becomes more complex. To reduce table noise, the microphones may be mounted in a rubber casing, and sound insulation is placed below the microphone.

The camera may employ a lens shield, which is up in normal operating mode, and down in privacy mode. Alternately, the shutter for the camera sensors can be turned off or the camera can be electronically isolated to turn off the camera while in privacy mode. The microphones are also preferably turned off when the privacy mode is evoked. During recording, a light on the camera is on to let users know the camera is active. When the camera is in privacy mode the light is turned off.

Various alternate embodiments of the integrated omni-directional camera and microphone design are possible. This is in part due to the modular nature of the system. For instance, in one embodiment an omni-directional camera is used that employs multiple video sensors to achieve 360 degree camera coverage. Alternately, in another embodiment of the invention, an omni-directional camera that employs one video sensor and a hyperbolic lens that captures light from 360 degrees to achieve panoramic coverage is used. Furthermore, either of these camera setups may be used by themselves, elevated on the acoustically transparent cylindrical rod, to provide a frontal view of the meeting participants. Or they can be integrated with the aforementioned microphone array. Alternately, other camera designs could also be used in conjunction with the cylindrical rod. The rod connecting the camera and microphone array also need not be cylindrical, as long as it is thin enough to not diffract sound in the (50-4000) Hz range.

Likewise, as discussed previously, in one embodiment the microphone array consists of microphones disposed at equilateral distances around the circumference of a circle and as near to a table surface as possible to achieve a clear path to any speaker in the room with minimum reflection of sound off the table. However, other microphone configurations are possible that can be integrated with an omni-directional camera setup using the acoustically transparent rod. Additionally, the omni-directional microphone array just discussed can be used without any camera to achieve optimum 360 degree sound coverage. This coverage is especially useful in sound source localization and beam-forming as multi-path problems are minimized or eliminated.

One embodiment employing the camera and microphone array of the invention uses a computer to optimize the image data and audio signals. The digital image output of the camera and the audio output of the microphone array (via an analog to digital converter) is routed into a computer. The computer performs various functions to enhance and utilize the image and audio input. For instance, a panoramic image filter stitches together images that are taken by various sensors in the omni-directional camera. Additionally, the image data can be compressed to make it more compatible for broadcast over a network (such as the Internet) or saved to a computer readable medium, preferably via a splitter that splits the video and audio output to be transmitted and/or recorded. Optionally, the image data can also be input into a person detector/tracker to improve camera management. For instance, the portions of the image/video containing the speaker can be identified, and associated with the audio signal, such that the camera view shown in the videoconference can be directed towards the speaker when they speak. Additionally, speaker location can be used to improve video compression by allowing greater resolution for facial regions than background.

The audio input can be also be used for various purposes. For instance, the audio can be used for sound source localization, so that the audio can be optimized for the speaker's direction at any given time. Additionally, a beam forming module can be used in the computer to improve the beam shape of the audio thereby further improving filtering of audio from a given direction. A noise reduction and automatic gain control module can also be used to improve the signal to noise ratio by reducing the noise and adjusting the gain to better capture the audio signals from a speaker, as opposed to the background noise of the room. Each of these image and audio processing modules can be used alone, or in combination, or not at all.

The video and audio signals, either enhanced or not, can be broadcast to another video conferencing site or the Internet. They also can be saved to a computer readable medium for later viewing.

The primary application for the above-described integrated camera and microphone array is videoconferencing and meeting recording. By integrating the microphone array with the omni-directional camera, the calibration between the video and audio needed is greatly simplified (a precisely manufactured camera and microphone array needs no calibration) and gathering audio and video information from a conference room with a single device is achieved.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS 1.0 Exemplary Operating Environment In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
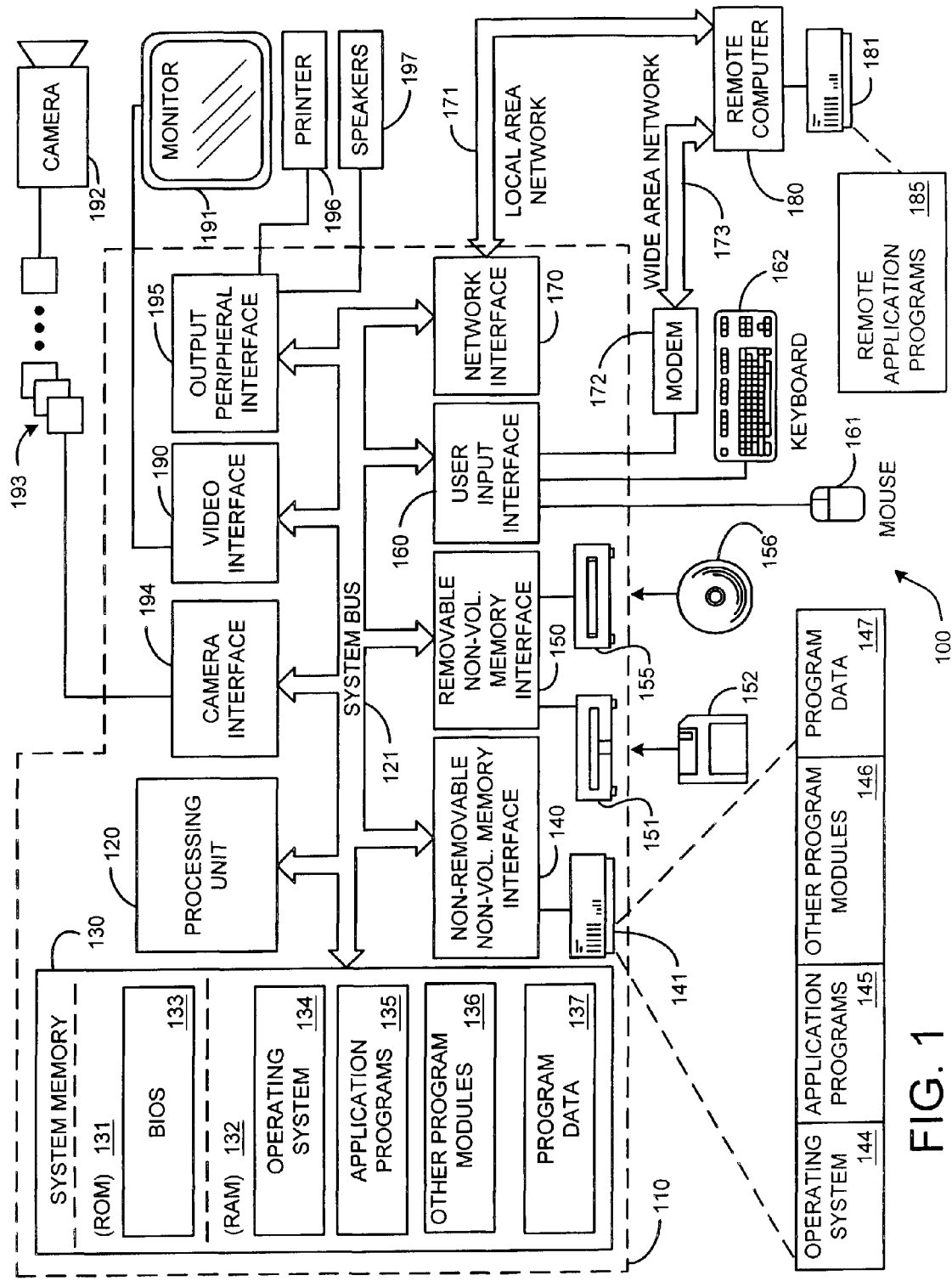
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

3.0 Integrated Omni-Directional Camera and Microphone Array

In this section, the integrated omni-directional camera and microphone array, connected via an acoustically transparent rod, is discussed.

3.1 Overview

This invention addresses how to optimally integrate an omni-directional camera with a microphone array. The goals of the design were that:

1. The microphone array design should provide a clear path from a speaking person to all microphones in the array. If a clear path is not possible, then any sound source localization and beam-forming algorithms used become exceedingly difficult and give degraded results.
2. The microphone array design should place the microphones as close to a desktop or other surface as possible to prevent sound reflections from the surface, which would degrade any sound source localization and beam-forming results.
3. The camera array should be elevated to provide a near frontal view of meeting participants. The camera array should be small enough to be unobtrusive.
4. The microphone array geometry (positions and distances between microphones) should allow the audio processing algorithms to achieve good beam shape, directed to the speaker, in the working frequency band, thereby providing high quality sound.

3.2 Integrated Design

The integrated camera and microphone array employs a cylindrical pole that connects the microphone base to the camera array. This pole is acoustically invisible for the frequency ranges of human speech (50-4000 Hz).

Figure 2:
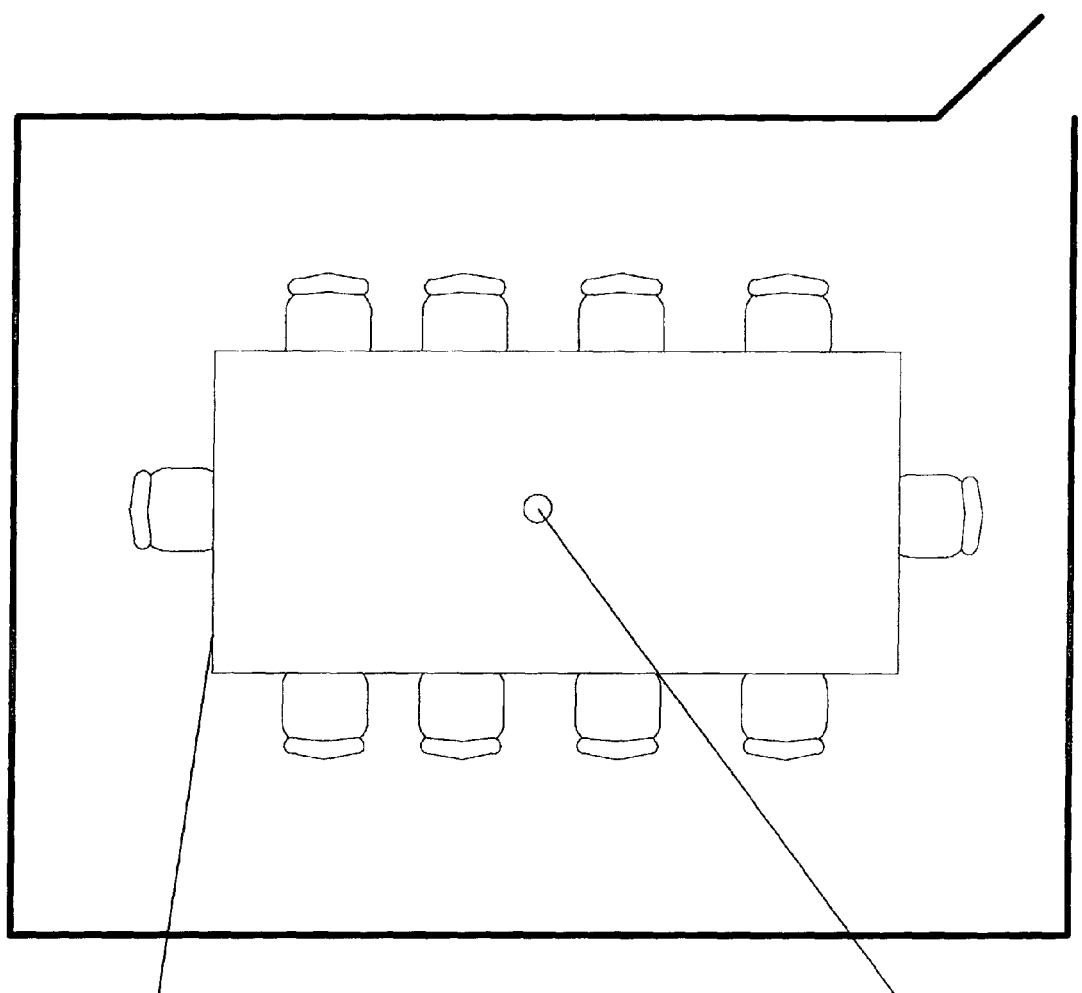
FIG. 2 is a diagram depicting a preferable positioning of the integrated camera and microphone array on a conference table.

As shown in FIG. 2, the integrated camera and microphone array 202 is intended to be placed in the center of a conference room table 204.

The design provides a clear path to all microphones from any given speaker or sound source and places the microphone array close to the table top to avoid multi-path problems caused from sound reflections from the table. Additionally, the design elevates the camera from the desktop, thus providing a frontal or near frontal view of all meeting participants.

The integrated camera and microphone array ensures a good beam shape that can be used for improving the sound quality of the speaker by filtering sound from only one direction. Furthermore, the integrated nature of the camera and microphone is advantageous because it eliminates the need for repeated calibrations. Since the camera and microphone are integrated as a single device, only one initial calibration is necessary. Also, since the integrated camera and microphone can be of a compact, fixed design, it is much less intrusive than two separate camera and microphone components that would require separate cables and additional space on the conference table.

3.3 System Components.

Figure 3A:
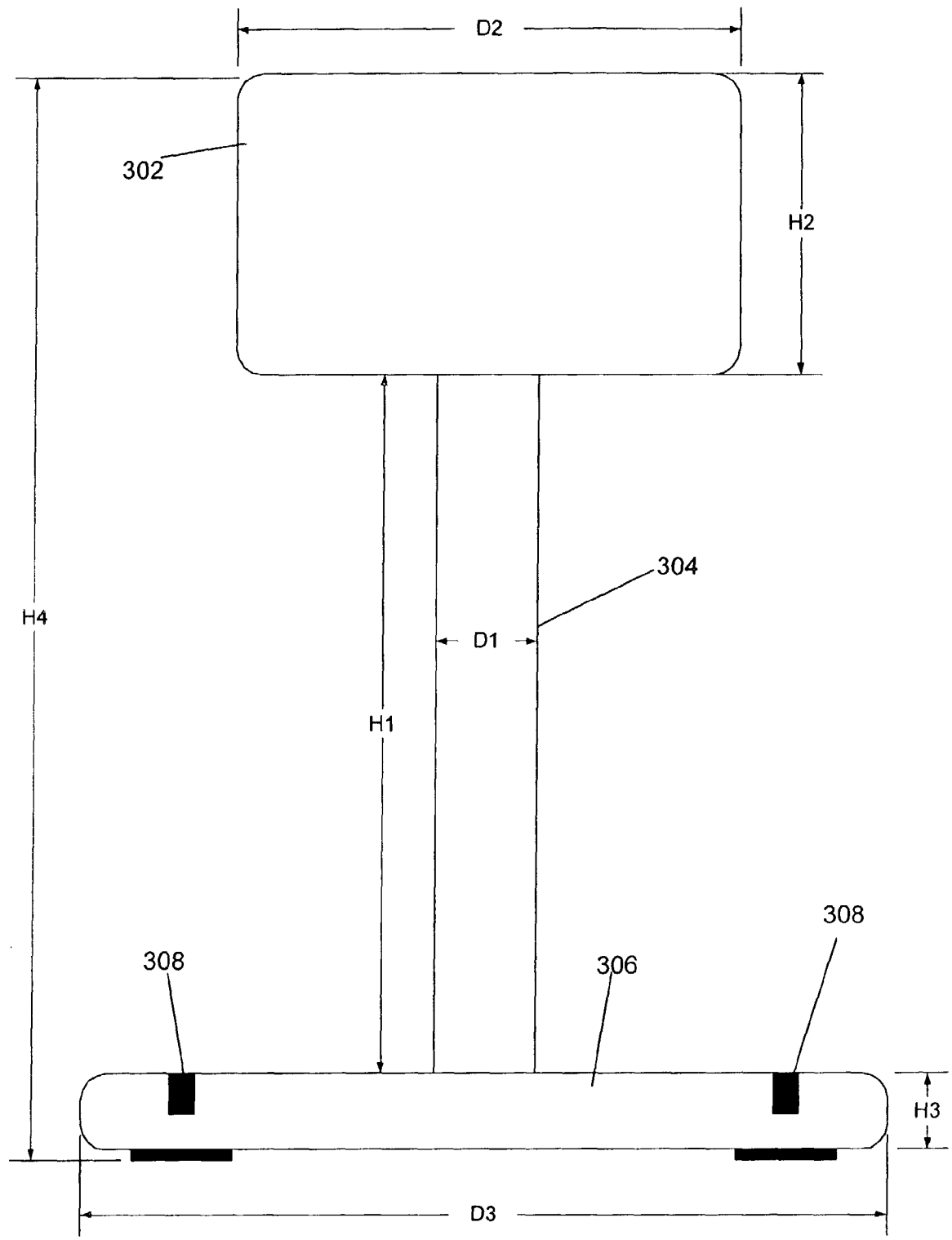
FIG. 3A is a side view of one embodiment of the integrated camera and microphone array.
Figure 3B:
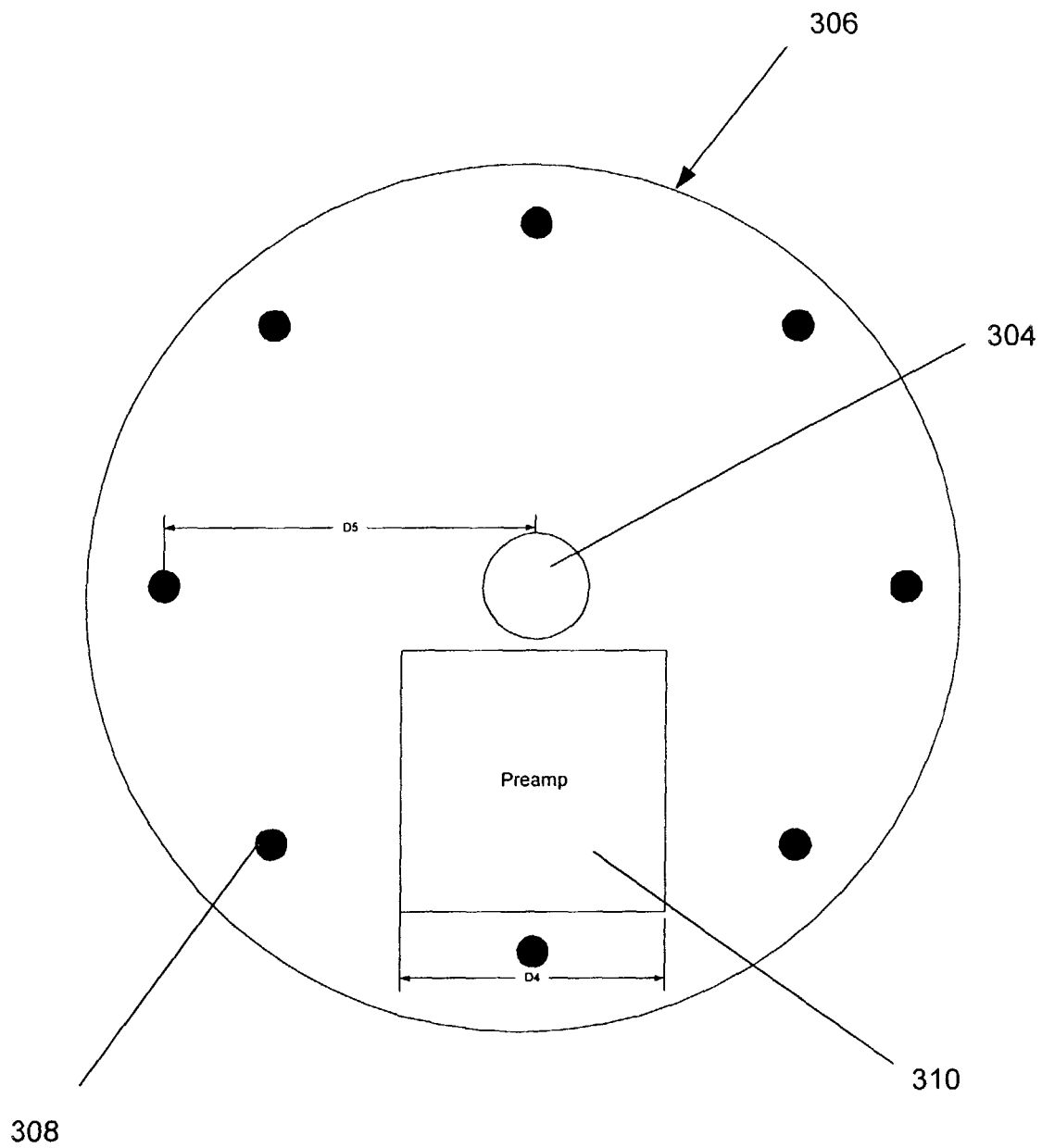
FIG. 3B is a top view of the embodiment of the integrated camera and microphone array shown in FIG. 3A.

One embodiment of the integrated omni-directional camera and microphone array is shown in FIG. 3A and FIG. 3B. The components in this design include an omni-directional camera 302, a cylinder 304, a microphone base 306, microphones 308, a microphone preamplifier 310 and an analog to digital (A/D) converter (not shown).

3.3.1 Omni-Directional Camera

A variety of omni-directional camera technologies exist. These include one camera type wherein multiple video sensors are tightly packed together in a back-to-back fashion. Another omni-directional camera type employs a single video sensor with a hyperbolic lens that captures light rays from 360 degrees. The integrated camera and microphone array design of the invention can use any such omni-directional camera. It is preferable that the camera head 302 should be small enough so as not to be intrusive when set on a conference room table or other surface.

If a multi-sensor camera configuration is used, a plurality of camera or video sensors can be employed. A preferred number is eight. These sensors should preferably be disposed in a back-to-back fashion such that the center of projection of each sensor is an equal angular distance apart. For example, if eight sensors are used, then each sensor would be 45 degrees from the sensors adjacent to it. However, it is possible to employ different lenses and different camera placement if it is necessary to capture images at different distances. For instance, such would be the case in a rectangular or oval conference table. Lenses with longer, narrower fields of view can be used for the longer distances, and wider, shorter fields of view could be used to capture images at shorter distances. In this case the camera sensors might not be equilaterally disposed around the camera head. Camera sensors with a wider field of view can be placed further away from camera sensors with a narrower field of view. Alternately, cameras with a variable field of view (that rotate and zoom in and out to adjust to a given situation) can also be employed.

Figure 4:
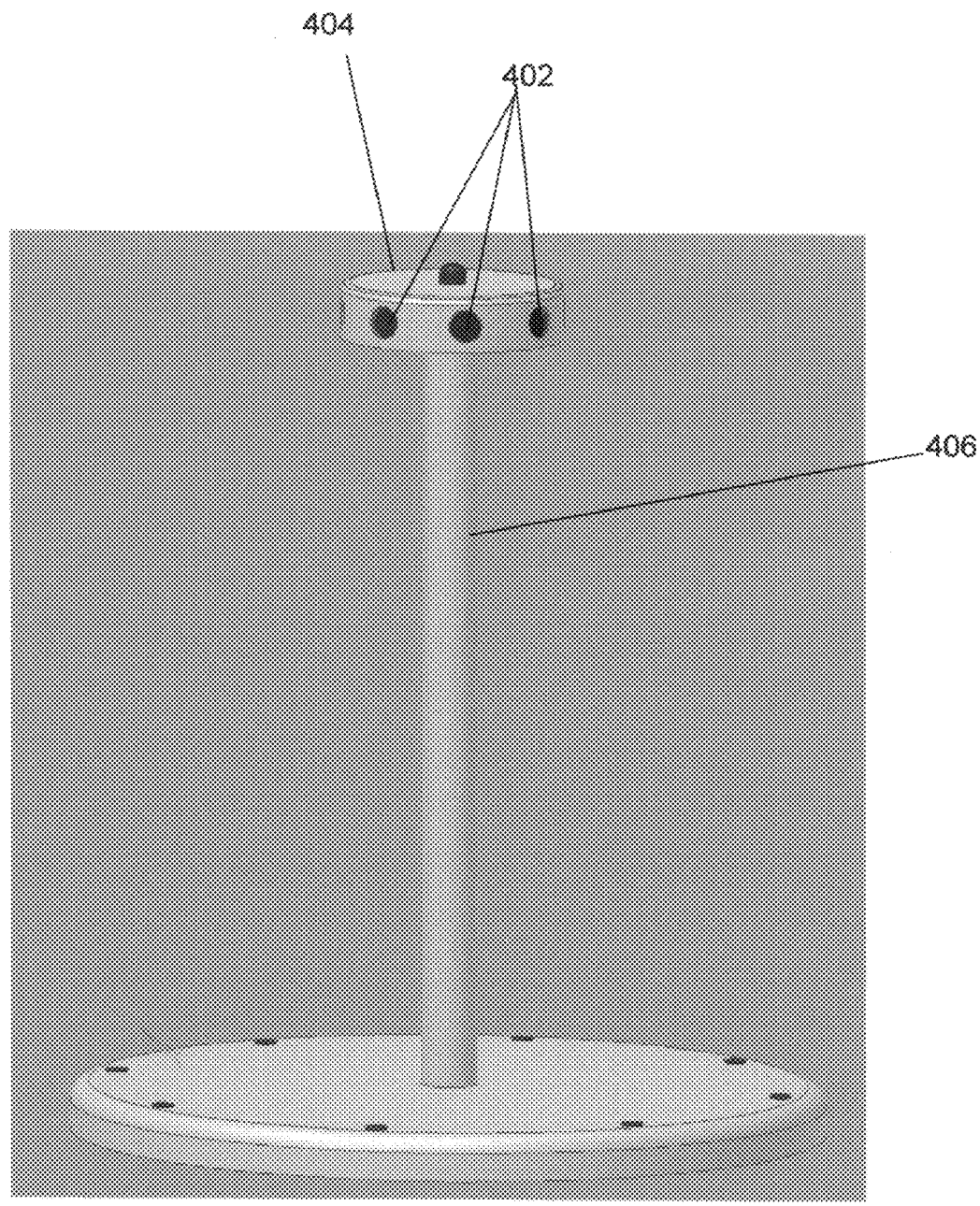
FIG. 4 is a perspective view another embodiment of the integrated camera and microphone array.

One working embodiment of the invention, shown in FIG. 4, uses a compact multi-sensor design wherein multiple miniature camera sensors 402 are configured in a back-to-back fashion around the circumference of a round camera head 404. The bottom of the camera 404 preferably has sound absorbing material to prevent sound reflections from the desk to the camera to the microphone from occurring. In this embodiment, 8 camera sensors are used. This compact design, wherein the camera sensors are packed tightly together in a back-to-back fashion, improves image stitching. In this embodiment, the camera head 404 is approximately 50 mm across, and the cylinder 406 connecting the camera head to the base is approximately 10 inches in height. This height places the camera 404 such that it obtains frontal views of all meeting participants. Alternately, the camera head 404 can be lower than this and the camera sensors 402 can be directed slightly upward. This also makes the camera somewhat less obtrusive.

3.3.2 Cylinder

Referring to the embodiment shown in FIGS. 3A and 3B, the omni-directional camera 302 is attached to a preferably hollow cylinder 304, which is attached to a microphone base 306. The cylinder diameter, $D_1$, should be thin enough to make the cylinder 304 acoustically transparent for frequencies corresponding to the intended use. It is preferred that camera cables are routed through the cylinder 304, so as to not provide any additional acoustic barriers. The cylinder height, $H_1$, should be high enough to provide a frontal view of every person sitting around the conference table, but should not be so high as to cause the camera to be obtrusive. The cylinder height can be also optionally be made adjustable. For instance, in a video conferencing application the cylinder height can be adjusted to account for variable desk and participant heights.

Referring again to the working embodiment shown in FIGS. 3A and 3B, the cylinder 304 has a diameter, $D_1$, of 2 cm or less, which permits audio frequencies from approximately 50-4000 Hz, corresponding to that of the human voice, to pass through the cylinder essentially undisturbed from any speaking participant to all of the microphones in the base. The cylinder height, $H_1$, in this embodiment is 14 cm.

3.3.3 Microphone Base

In general, the microphone base holds the microphones, microphone preamplifier, and A/D converter. It connects to the cylinder, and provides a connection outlet for the camera cables. The microphone base is low profile, to minimize the distance between the desktop and the microphones. The base allows a direct path from each microphone to the participant(s).

In the working embodiment of the integrated camera and microphone array is shown in FIGS. 3A and 3B. The diameter $D_3$ of the microphone base 306 is wider than the diameter $D_2$ of the camera head 302. This provides the integrated camera and microphone array with stability, preventing it from easily being knocked over. The height of the base, $H_3$, is relatively small. This dimension is preferably low enough to keep the embedded microphones 308 close enough to the table surface to avoid multi-path problems, but high enough to allow the microphones 308 to be embedded in the base. For this working embodiment, $D_3$ is 16 cm, $H_3$ is 1.5 cm, $H_2$ is 6 cm and $D_2$ is 10 cm.

3.3.4 Microphones

The microphones used can be either omni-directional or unidirectional, though omni-directional microphones are preferred, as they give a uniform response for all sound angles of interest. The minimum number of microphones needed is three, though the embodiment of the invention uses eight for increased sound source localization accuracy, better beamforming and robustness of the whole audio system.

To reduce table noise, the microphones may be mounted in a rubber casing, and sound insulation may be placed below the microphones for the same purpose.

Referring again to the working embodiment shown in FIGS. 3A and 3B, the microphones 308 are equilaterally disposed around the circumference of a circle on the planar microphone base 306. In this embodiment eight microphones 308 are employed. In general, the more microphones that are used the better the omni-directional audio coverage and signal to noise ratio is. However, the cost and complexity of greater numbers of microphones is a tradeoff. Additionally, with more microphones processing of the audio signals becomes more complex. In the working embodiment shown in FIGS. 3A and 3B, the distance from the center of the cylinder 306 to the center of each microphone 308, $D_5$, is 7 cm.

3.3.5 Microphone Preamplifier, A/D Converter

The microphone preamplifier 310 and analog to digital (A/D) converter (not shown) are preferably integrated into the microphone base 306, as shown in FIG. 3B. In this embodiment, the width of the preamplifier 310, $D_4$, is 5.901 cm. The microphone preamplifier amplifies the signals from the microphones to normalize the signal amplitudes for the following A/D converter. The A/D converter converts the analog signals from the camera to digital.

In this embodiment, the signal sampling of the signals from the microphones is synchronized to within 1 microsecond of each other, to facilitate sound source localization and beam-forming.

3.4 Privacy Mode

The camera may employ a lens shield, which is open in normal operating mode, and closed in privacy mode. Alternately, the shutter for the camera sensors can be turned off or the camera could be electronically isolated to turn off the camera while in privacy mode. The microphones are also preferably turned off when the privacy mode is evoked. During recording, a light on the top of the camera is on to let users know the camera is active. When privacy mode is on the light is turned off.

4.0 Alternate Embodiments Due to Modular Nature

Various alternate embodiments of the integrated omni-directional camera and microphone design are possible. This is in part due to the modular nature of the system.

For instance, various camera embodiments can be employed. In one embodiment, an omni-directional camera is used that employs multiple video sensors to achieve 360 degree camera coverage. Alternately, in another embodiment of the invention, an omni-directional camera that employs one video sensor and a hyperbolic lens that captures light from 360 degrees to achieve panoramic coverage is used. Furthermore, either of these cameras may be used by themselves, elevated on the acoustically transparent cylindrical rod, to provide a frontal view of the meeting participants. Or either of the cameras can be integrated with a microphone array. Alternately, other omni-directional camera designs can also be used in conjunction with the cylindrical rod and/or microphone array.

Likewise, various microphone configurations can be employed. In one embodiment the microphone array consists of microphones disposed at equilateral distances around the circumference of a circle and as near to a table surface as possible to achieve a clear path to any speaker in the room. However, other microphone configurations are possible that can be integrated with a camera using the acoustically transparent rod. Alternately, the omni-directional microphone array just discussed can be used without any camera to achieve optimum 360 degree sound coverage. This coverage is especially useful in sound source localization and beam-forming as multi-path problems are minimized or eliminated.

In one embodiment of the integrated camera and microphone array, image stitching and compression are performed on a PC. An alternate embodiment performs the image stitching and compression in the camera with a Field Programmable Gate Array (FPGA) or other gate array. This design uses a USB interface to interface the camera and PC, and allows the PC more CPU cycles to do other tasks such as image compression and recording/broadcasting the meeting.

5.0 Exemplary Working Embodiment

Figure 5:
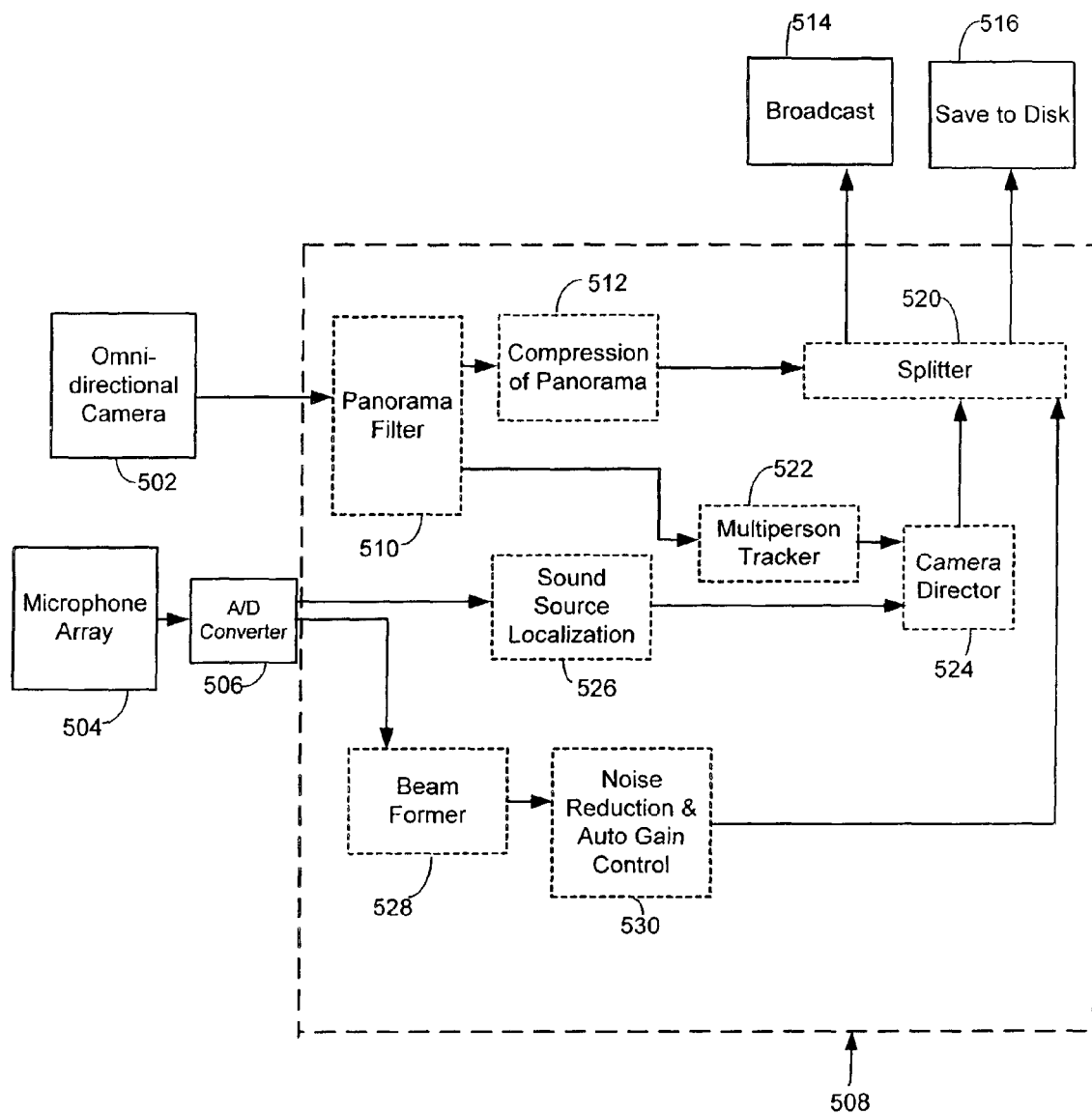
FIG. 5 is one working embodiment of the present invention that uses a computer to enhance the video and audio data captured.

One working embodiment employing the camera 502 and microphone array 504 of the invention is shown in FIG. 5. The image output of the camera 502 and the audio output of the microphone array 504 is routed via an analog to digital converter 506 to a computer 508. The computer 508 performs various functions to enhance and utilize the image and audio input. For instance, a panoramic filter module 510 stitches together images that are taken by various sensors in the omni-directional camera 502. Additionally, the image data can be compressed by a compression module 512 to make it more compatible for broadcast 514 over a network (such as the Internet) or saved to a computer readable medium 516 (preferably via a splitter 520). Optionally, the image data can also be input into a person detector/tracker module 522 to improve camera management 524. For instance, the portions of the image/video containing the speaker can be identified, and associated with the audio signal, and the images captured by the camera/sensor directed towards the speaker will be broadcast or saved to disk.

The audio input can be also be used for various purposes. For instance, the audio can be input into a sound source localization module 526, so that the audio from the speaker is isolated. Additionally, a beam-forming module 528 can be used in the computer 508 to improve the beam shape of the audio. A noise reduction and automatic gain control module 530 can also be used to improve the signal to noise ratio by reducing the noise and adjusting the gain to better capture the audio signals from a speaker, as opposed to the background noise of the room.

As mentioned previously, the video and audio signals can be broadcast to another video conferencing site or the Internet. They also can be saved to a computer readable medium for later viewing.

The foregoing description of the invention has been presented for the purposes of illustration and description. It is not intended to be exhaustive or to limit the invention to the precise form disclosed. For instance, embodiments of the integrated camera and microphone array as discussed above could be applied to a surveillance system. Many modifications and variations are possible in light of the above teaching. It is intended that the scope of the invention be limited not by this detailed description, but rather by the claims appended hereto.

Wherefore, what is claimed is:

1. A system for capturing audio and video data comprising:
   one or more cameras that capture video image data;
   an array of microphones, that captures audio signals; and
   a cylinder connecting said one or more cameras to said microphone array, said cylinder being acoustically transparent in the frequency range of the human voice.

2. The system of claim 1 wherein said one or more cameras capture images over 360 degrees.

3. The system of claim 1 further comprising a microphone array base, and wherein said microphones are mounted to said microphone array base.

4. The system of claim 3 wherein the height of said microphone array base is small enough to position said microphone array to minimize sound reflections picked up by the array from any surface.

5. The system of claim 1 wherein the frequency range to which the cylinder is acoustically transparent is 50-4000 hertz.

6. The system of claim 1 wherein the audio signals are input into a computer, said computer using said audio signals for sound source localization, said sound source localization determining the direction of sounds producing the audio signals.

7. The system of claim 1 wherein the audio signals are input into a computer, said computer using said audio signals for beam-forming, said beam-forming improving the sound quality of a sound from one direction by filtering out the sound from all other directions.

8. The system of claim 1 wherein the audio signals are input into a computer, said computer using human detection and tracking algorithms to accurately detect a person captured in the video image data and associate the video image data of the person with the audio signals generated by the person speaking.

9. The system of claim 1 wherein the video image data is input into a computer, said computer using said video image data to stitch images together.

10. The system of claim 1 wherein microphones in the microphone array are omni-directional.

11. The system of claim 1 wherein the microphones in the microphone array are unidirectional.

12. The system of claim 1 wherein the microphone array comprises three microphones.

13. The system of claim 1 wherein the microphone array comprises eight microphones.

14. The system of claim 1 wherein the microphone array comprises a plurality of microphones that are equilaterally disposed in a circle around the circumference of a planar microphone base.

15. The system of claim 14 wherein at least one microphone is mounted in a rubber casing to protect it from extraneous sound reflections.

16. The system of claim 14 wherein sound insulation is placed below at least one microphone to protect it from extraneous sound reflections.

17. The system of claim 1 wherein said camera further comprises a lens cover, which is up in a normal operating mode, and down in a privacy mode.

18. The system of claim 17 wherein the microphones are turned off when the camera is in said privacy mode is evoked.

19. The system of claim 1 wherein a light on camera is on when the camera is active.

20. The system of claim 1 wherein the audio signals are transmitted over a network.

21. The system of claim 1 wherein the audio signals are saved to a computer-readable medium.

22. The system of claim 1 wherein the video image data is transmitted over a network.

23. The system of claim 1 wherein the video image data is saved to a computer-readable medium.

24. The system of claim 1 wherein the video signals are transferred to a computer using a 1394 bus.

25. The system of claim 1 wherein the audio signals are transferred to a computer using analog cables.

26. The system of claim 1 wherein said cameras are IEEE 1394 cameras.

27. A process of capturing video and audio for teleconferencing and meeting recording, comprising the following process actions:
  capturing images of persons in a meeting with an omni-directional camera,
  capturing audio signals of sounds occurring in said meeting with a microphone array, said microphone array being housed in a base which is connected to said omni-directional camera by an acoustically transparent rod.

28. The process of claim 27 wherein said microphone array is placed on a table and said wherein said persons in said meeting are seated around said table.

29. The process of claim 28 wherein the microphone array is as close to said table as possible to minimize sound reflections from the table being picked up by the array.

30. The process of claim 27 wherein the microphone array comprises 3 or more microphones.

31. The process of claim 30 wherein said microphone array comprises microphones that are equally spaced in a circle adjacent the circumference of the microphone base.

32. The process of claim 27 wherein the omni-directional camera comprises multiple video sensors.

33. The process of claim 32 wherein said video sensors are equally spaced around the circumference of a circle.

34. The process of claim 27 wherein the omni-directional camera comprises a single video sensor with a hyperbolic lens that captures light rays from 360 degrees.

35. The process of claim 27 wherein said acoustically transparent rod is hollow.

36. The process of claim 27 wherein said acoustically transparent rod is attached to a microphone base and wherein camera cables go through the acoustically transparent rod so said cables do not cause acoustic barriers.

37. The process of claim 27 wherein the outside diameter of said acoustically transparent rod is 2 centimeters or less.

38. The process of claim 27 wherein the acoustically transparent rod has a diameter so as to permit audio frequencies from 50 to 4000 Hz to pass by the acoustically transparent rod essentially undisturbed from a person speaking to all microphones in the microphone array.

39. The acoustically transparent rod of claim 27 wherein said rod height is adjustable.

40. An integrated omni-directional camera and microphone array comprising:
  an omni-directional camera;
  an acoustically transparent rod that elevates said camera to provide optimum camera coverage; and
  a microphone array.

41. The integrated omni-directional camera and microphone array of claim 40 wherein said omni-directional camera employs multiple video sensors to achieve 360 degree camera coverage.

42. The integrated omni-directional camera and microphone array of claim 40 wherein said omni-directional camera employs one video sensor and a hyperbolic lens that captures light from 360 degrees to achieve panoramic coverage.

43. The integrated omni-directional camera and microphone array of claim 40 wherein the acoustically transparent cylindrical rod elevates said camera to provide a frontal view of people sitting around a table.

44. The integrated omni-directional camera and microphone array of claim 40 wherein the microphone array comprises a plurality of microphones disposed at equilateral distances around the circumference of a circle.

45. The integrated omni-directional camera and microphone array of claim 40 wherein the microphone array is sitting on a surface, as close to the surface as possible to minimize sound reflections from said surface.

46. The integrated camera and microphone array of claim 41 wherein video sensors with longer, narrower fields of view are used to capture images at the longer distances, and video sensors with wider, shorter fields of view are used to capture images at shorter distances.

47. A system for capturing audio and video data comprising:
  one or more cameras that capture image data;
  an array of microphones, wherein said microphones are disposed at equilateral distances around the circumference of a circle, that captures audio signals; and
  a cylinder connecting said one or more cameras to said microphone array, said cylinder being acoustically transparent in the frequency range of the human voice, and positioned so as to be substantially in the center of the array of microphones arranged in said circle such that sound waves from a sound source pass by the cylinder in order to reach at least one microphone of the array.

48. The system of claim 47 wherein said one or more cameras capture images over 360 degrees.

49. The system of claim 47 wherein the audio signals are input into a computer, said computer using said audio signals for sound source localization, said sound source localization determining the direction of sounds producing the audio signals.

50. The system of claim 47 wherein the audio signals are input into a computer, said computer using said audio signals for beam-forming, said beam-forming improving the sound quality of a sound from one direction by filtering out the sound from all other directions.

51. A system for capturing audio and video data comprising:
    one or more cameras that capture video image data;
    an array of microphones, that captures audio signals; and
    a straight rigid cylinder connecting said one or more cameras to said microphone array, said straight rigid cylinder being acoustically transparent in the frequency range of the human voice.

* * * * *